(12) United States Patent
Lesko et al.

(10) Patent No.: US 12,041,201 B2
(45) Date of Patent: Jul. 16, 2024

(54) TOTAL SCREEN RECORDING SYSTEM AND METHODS

(71) Applicant: NICE LTD, Ra'anana (IL)

(72) Inventors: Viktor Lesko, Vinnytsia (UA); Vitalii Rozbyiholova, Zarvantsi (UA); Pavlo Osikovskyi, Gnivan (UA)

(73) Assignee: NICE LTD.

( * ) Notice: Subject to any disclaimer, the term of this patent is extended or adjusted under 35 U.S.C. 154(b) by 0 days.

(21) Appl. No.: 17/713,413

(22) Filed: Apr. 5, 2022

(65) Prior Publication Data

US 2023/0319186 A1 Oct. 5, 2023

(51) Int. Cl.
*H04M 3/00* (2024.01)
*G06F 3/0484* (2022.01)
*G06F 3/14* (2006.01)
*H04M 3/51* (2006.01)

(52) U.S. Cl.
CPC ........ *H04M 3/5175* (2013.01); *G06F 3/0484* (2013.01); *G06F 3/14* (2013.01); *H04M 3/5133* (2013.01); *H04M 3/5183* (2013.01)

(58) Field of Classification Search
CPC ............. H04M 3/5175; H04M 3/5133; H04M 3/5183; G06F 3/0484; G06F 3/14
See application file for complete search history.

(56) References Cited

U.S. PATENT DOCUMENTS

| | | | | |
|---|---|---|---|---|
| 2015/0131792 | A1* | 5/2015 | Kuhn | H04M 3/42221 379/265.03 |
| 2015/0363165 | A1* | 12/2015 | Zhou | H04M 1/271 715/728 |
| 2019/0235476 | A1* | 8/2019 | Oba | G01D 9/285 |

* cited by examiner

*Primary Examiner* — Rasha S Al Aubaidi
(74) *Attorney, Agent, or Firm* — Haynes and Boone, LLP

(57) ABSTRACT

Screen recording systems and methods, and non-transitory computer readable media, include receiving, from an applications server, a recording configuration including a local recording trigger, wherein the local recording trigger includes a start screen recording event and a stop screen recording event; monitoring activity on a device of a contact center agent; initiating recording of a screen of the device when the start screen recording event is detected; transmitting data captured in the recording to a recorder; stopping the recording of the screen of the device when the stop screen recording event is detected; and stopping transmission of the data captured in the recording to the recorder.

20 Claims, 9 Drawing Sheets

TOTAL SCREEN RECORDING SYSTEM AND METHODS

TECHNICAL FIELD

The present disclosure relates generally to methods and systems for screen recording, and more specifically relates to methods and systems that include a screen recording application on a device that makes a recording decision without a control layer event.

BACKGROUND

In a call center (also referred to herein as a contact center) setting, screen capture software enables companies to secure a permanent record of every interaction between agents and customers. By recording agents' screens, call center managers can better assess agent performance and provide coaching and feedback. Additionally, screen recording software can capture the sequence of screens an agent accessed, including any data they entered. Screen recording allows call center managers to improve efficiencies and compliance.

Screen recording is generally based on control layer recording events (e.g., selective recording). In current screen recording solutions, an interactions center represents a control layer that communicates with a computer telephony interface (CTI) and provides start and stop screen recording requests to an advanced interaction recorder. The advanced interaction recorder sends start and stop control requests to a call center agent device and receives and stores captured screen media.

Current systems, however, have no ability to operate when the control layer is down or disconnected. It is not possible to start screen recording without a recording request that comes from the control layer. Without the control layer command and the recording requests, the screen capture software does not start screen recording. The screen capture software simply waits for recording requests, which will not occur if the control layer is down or disconnected.

Accordingly, a need exists for improved systems and methods for screen recording that does not depend on a control layer.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
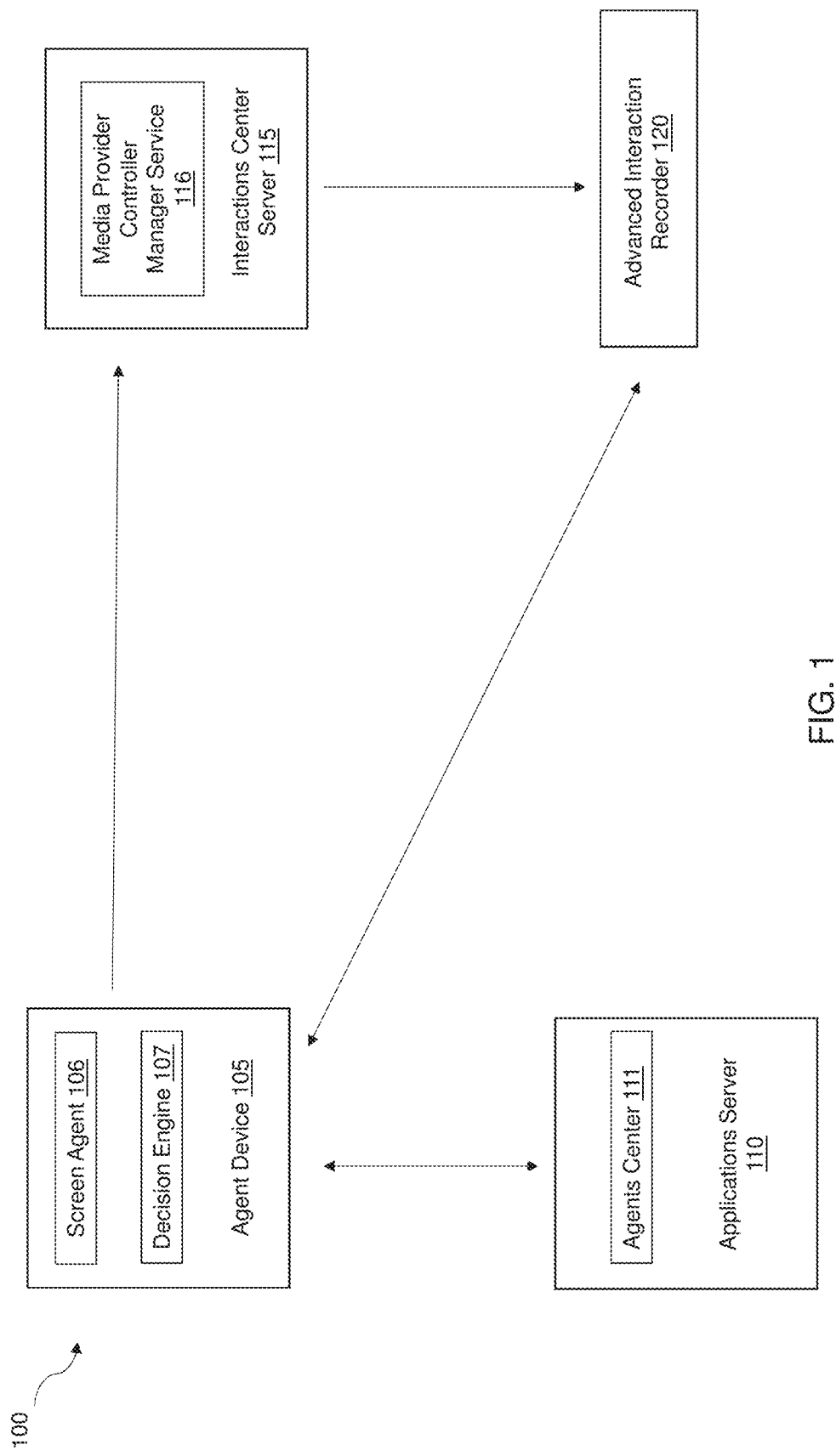
FIG. 1 is a simplified block diagram of a screen recording system according to various aspects of the present disclosure.

This description and the accompanying drawings that illustrate aspects, embodiments, implementations, or applications should not be taken as limiting—the claims define the protected invention. Various mechanical, compositional, structural, user interface, electrical, and operational changes may be made without departing from the spirit and scope of this description and the claims. In some instances, well-known circuits, structures, on-screen arrangements, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present systems and methods apply a unique method (or combination of methods) to make a recording decision and auto-trigger screen recording by waiting for a local recording trigger that initiates and terminates screen recording without a control layer. The algorithm is based on monitoring local recording triggers (such as an application performance counter, activity of a keyboard or mouse, or a user interface control action) defined in a recording configuration. In some embodiments, the screen recording is linked to an audio call based on the start and stop times of the call and agent details (e.g., ID or name).

In one or more embodiments, telephony activity is monitored by using one or more application performance counters (e.g., network performance counters, central processing unit performance counters, etc.). Performance counters are bits of code that monitor, count, or measure events in software, which allow a user to see patterns from a high-level view. In several embodiments, the application performance counter is associated with a defined threshold that is linked to the start screen recording event and the stop screen recording event. In various embodiments, when a value of the application performance counter goes above the defined threshold, recording of the screen is initiated, and when the value of the application performance counter goes below the defined threshold, recording of the screen is stopped. Other types of local recording triggers work on a similar principle, but monitor appropriately configured environmental parameters. In certain embodiments, the recording configuration includes the name of the application performance counter and the defined threshold.

In some embodiments, certain movement(s) on the screen that trigger screen recording are detected. For example, an agent's screen can be monitored to determine the mouse position and mouse clicks, keys on the keyboard pressed (including a combination of keys such as CTRL-R), or any combination thereof. Screen recording can be triggered based on a combination, e.g., mouse clicks, mouse movement, and/or keys (or sequence of keys such as R-E-C). In various embodiments, monitoring activity on the agent device includes monitoring a mouse position, a mouse click, a roll of a track ball, a key pressed on the keyboard, or any combination thereof (within or between these exemplary categories). In several embodiments, the recording configuration includes a value for movement of the mouse along a vertical axis, a value for movement of the mouse along a horizontal axis, a right click of the mouse, a left click of the mouse, the key pressed on the keyboard, or any combination thereof.

In various embodiments, certain software user interface controls that an agent interacts with or user interface actions are monitored. For example, screen recording can be triggered based on user controls on the screen in window applications or web pages, and/or buttons and windows that appear on the screen. Each window typically includes a title and a control name. In certain embodiments, the recording configuration includes a user interface control name and a type of control event.

FIG. 1 illustrates a block diagram of an exemplary screen recording system 100 according to embodiments of the present disclosure. The system 100 includes contact center agent device 105, an applications server 110, an interactions center server 115, and an advanced interaction recorder (AIR) 120. Agent device 105 has installed a screen recording application that includes screen agent application 106 and decision engine 107. Applications server 110 includes agents center application 111, and is responsible for providing the recording configuration, including the local recording triggers to a set of agent devices 105. Interactions center server 115 includes media provider controller manager service 116 that is used for screen recording application registration in the system 100. Interactions center server 115 represents the control layer that communicates with the CTI and provides start and stop screen recording requests to AIR 120. AIR 120 sends start and stop control requests to screen agent application 106 and receives and stores captured screen media.

Figure 2:
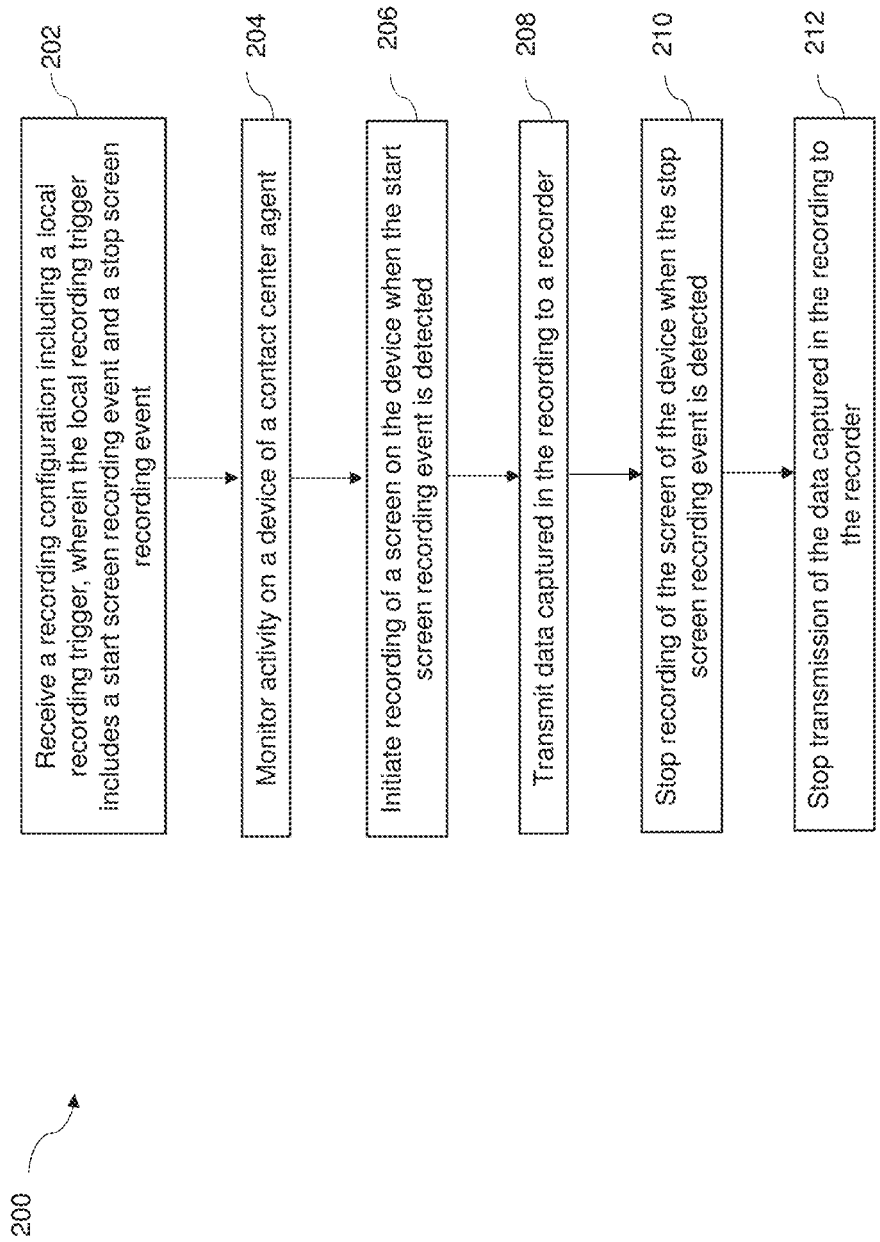
FIG. 2 is a flowchart of a method according to embodiments of the present disclosure.

Referring now to FIG. 2, a method 200 according to embodiments of the present disclosure is described. At step 202, agent device 105 via screen agent application 106 receives a recording configuration from applications server 110, including a local recording trigger. The local recording trigger includes a start screen recording event and a stop screen recording event. In one or more embodiments, screen agent application 106 on start sends a configuration request to agents center application 111. Agents center application 111 responds with a configuration file that includes the recording configuration. Screen agent application 106 then applies the received recording configuration.

In various embodiments, the recording configuration is stored as a complex object. The object contains a list of different property strings. In one embodiment, the recorded configuration is stored in an extensible markup language (XML) structure. Examples of properties include a trigger type, a performance counter name, a monitoring process name, a threshold range in percentage, move pattern points for a start recording event decision, move pattern points for a stop recording event decision, and/or a control element name. The recorded screen data buffers are held using byte-arrays, which store binary data.

Figure 3:
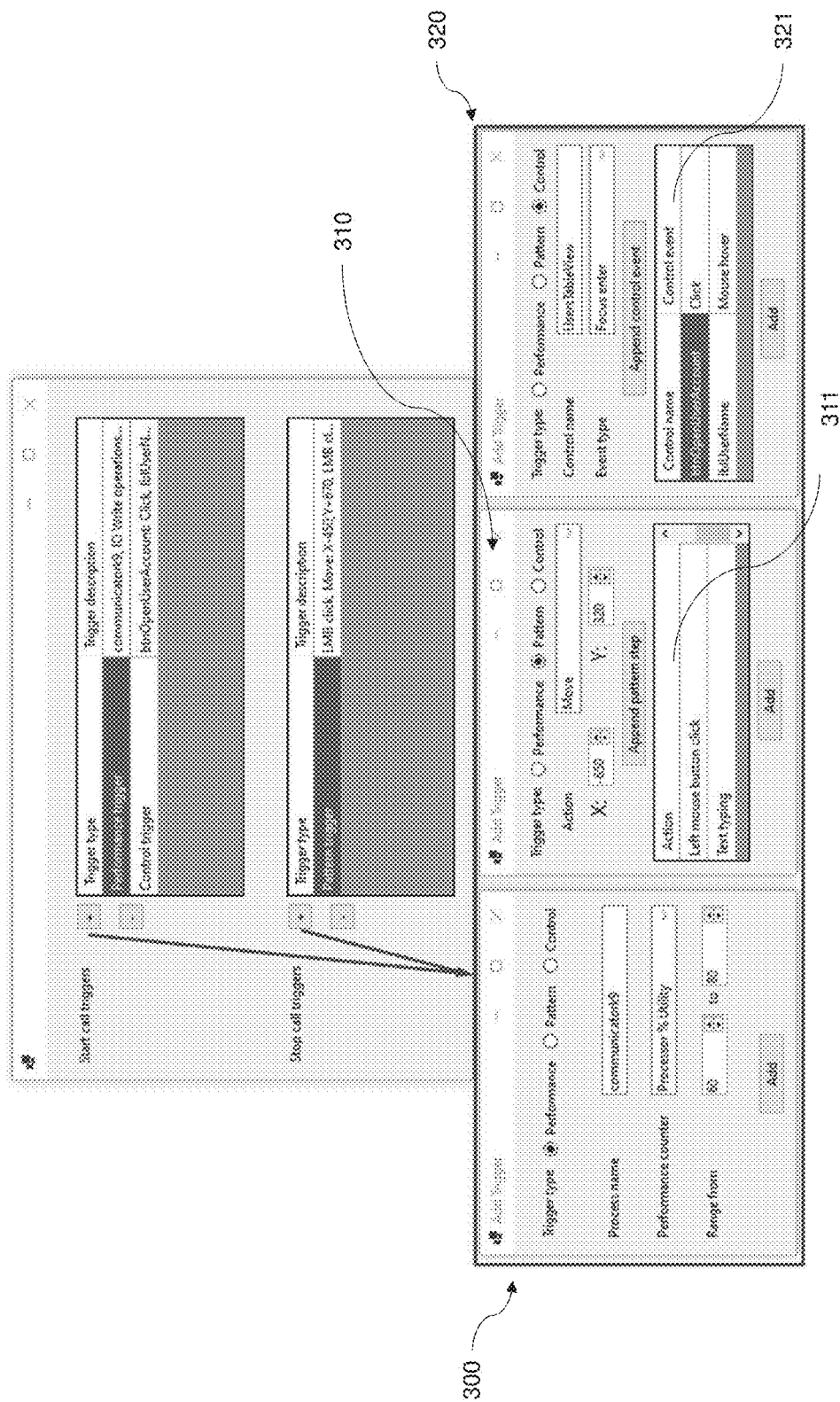
FIG. 3 illustrates exemplary graphical user interfaces for configuring a local recording trigger according to embodiments of the present disclosure.

Referring now to FIG. 3, illustrated are user interface examples that allow a user to configure start and stop recording events for local recording triggers. To create a new start or stop local recording trigger, a user can for example press the "+" button," and an "Add Trigger" window appears. The user can then select one of the three local recording trigger types (i.e., performance, pattern, or control). Depending on the selected type, a different form is offered to the user to complete.

To fill a trigger form for a performance type 300, a user typically types a monitored process name, selects one performance counter that should be monitored, specifies the activation percentage threshold for the selected performance counter, and then clicks the "Add" button. The new local recording trigger then appears on the local recording triggers list.

To fill a trigger form for a pattern type 310, a user selects a user action. If the "move" action is selected, the user typically specifies coordinate differences for a mouse cursor. As shown, the X value is for the vertical axis, and the Y value is for the horizontal axis (although the X value may be for the horizontal axis and the Y value for the vertical axis in an alternative embodiment). The user can then press the "Append pattern step" button. A new action subsequently appears on the actions list 311. The user can repeat the steps until all desired pattern steps are defined. When the user is done, the user can press the "Add" button. The new local recording trigger then appears on the local recording triggers list.

To fill a trigger form for a control type 320, the user typically types a monitored user interface control name, selects a monitored control event type, and presses the "Append control event" button. A new control name and control event appear in the list 321. The user can repeat these steps until all desired control event chain members are defined. Once the user is done, the user can press the "Add" button. The new local recording trigger then appears on the local recording triggers list.

To delete a local recording trigger, the user clicks on the appropriate row in the table of local recording triggers, presses the "−" button, and the selected local recording trigger disappears from the local recording triggers. It should be understood as to various embodiments for adding and deleting such local recording triggers that the user may be an individual contact center agent, or a supervisor or manager with the ability to create local recording trigger(s) for a single agent, a group of agents, all agents at the site, all agents with a given level or experience, all agents with a particular performance characteristic (which can be a deficiency in an aspect of performance), or any combination thereof.

In some embodiments, screen agent application 106 sends a registration request to media provider controller manager service 116 on interactions center server 115 to notify interactions center server 115 that it is in an active state. After successful registration, screen agent application 106 generally goes to an idle state.

At step 204, agent device 105 via decision engine 107 monitors activity on agent device 105 of a contact center agent. Screen agent application 106 waits for start recording events and stop recording events from decision engine 107, which monitors local recording triggers based on the recording configuration.

For example, assume the local recording trigger is based on an application performance counter. In an environment that includes Cisco® telephony, decision engine 107 monitors the "IO Other Operations/sec" counter that indicates Cisco® softphone activity. In various embodiments, for this application performance counter and other performance counters, there are defined thresholds that are specified or input during configuration of start and stop recording events for local recording triggers.

At step 206, agent device 105 via screen agent application 106 initiates recording of a screen on agent device 105 when the start screen recording event is detected. Screen recording by screen agent application 106 starts when screen agent application 106 receives a start recording event from decision engine 107.

Figure 4A:
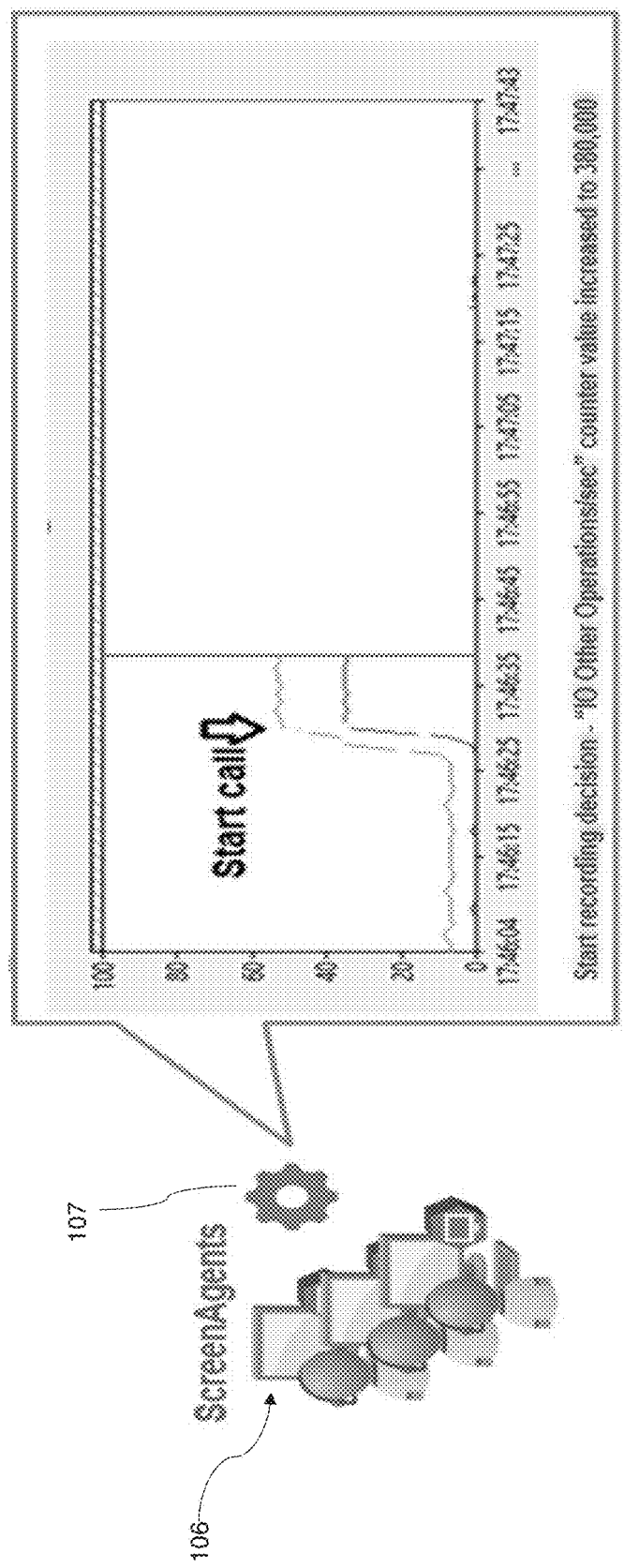
FIG. 4A illustrates monitoring of an application performance counter to initiate recording of a screen according to embodiments of the present disclosure.

Referring to FIG. 4A, decision engine 107 monitors the "IO Other Operations/sec" counter and if the value increases to 380,000, decision engine 107 activates a local recording trigger, and raises a start screen recording event, instructing screen agent application 106 to start recording.

At step 208, agent device 105 via screen agent application 106 transmits data captured in the recording to AIR 120. AIR 120 creates a file with the data.

At step 210, agent device 105 via screen agent application 106 stops recording of the screen of agent device 105 when the stop screen recording event is detected. In certain embodiments, screen agent application 106 waits for a stop recording event from decision engine 107.

Figure 4B:
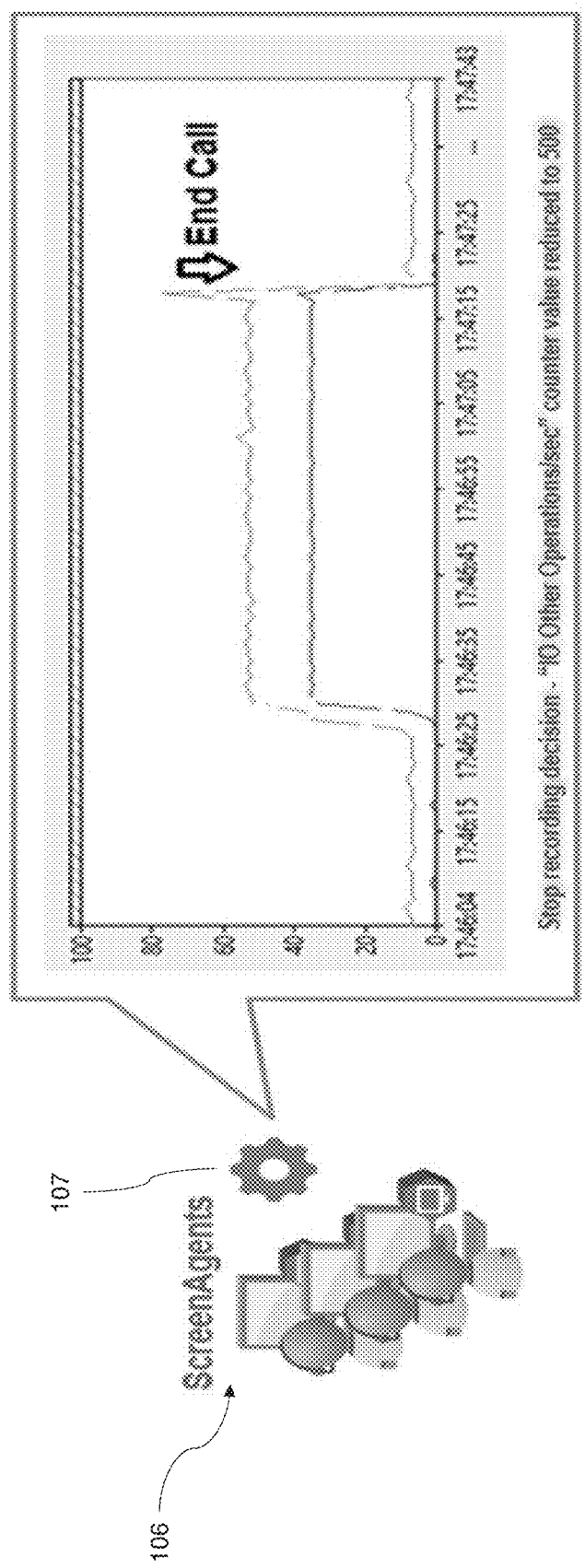
FIG. 4B illustrates monitoring of an application performance counter to stop recording of a screen according to embodiments of the present disclosure.

Referring now to FIG. 4B, when the "IO Other Operations/sec" counter value of Cisco® softphone performance counter decreases to 500, decision engine 107 activates the local recording trigger and raises a stop screen recording event.

At step 212, agent device 105 via screen agent application 106 stops transmission of the data captured in the recording to AIR 120. In various embodiments, screen agent application 106 stops sending captured data to AIR 120, which closes the file for future playback.

Figure 5:
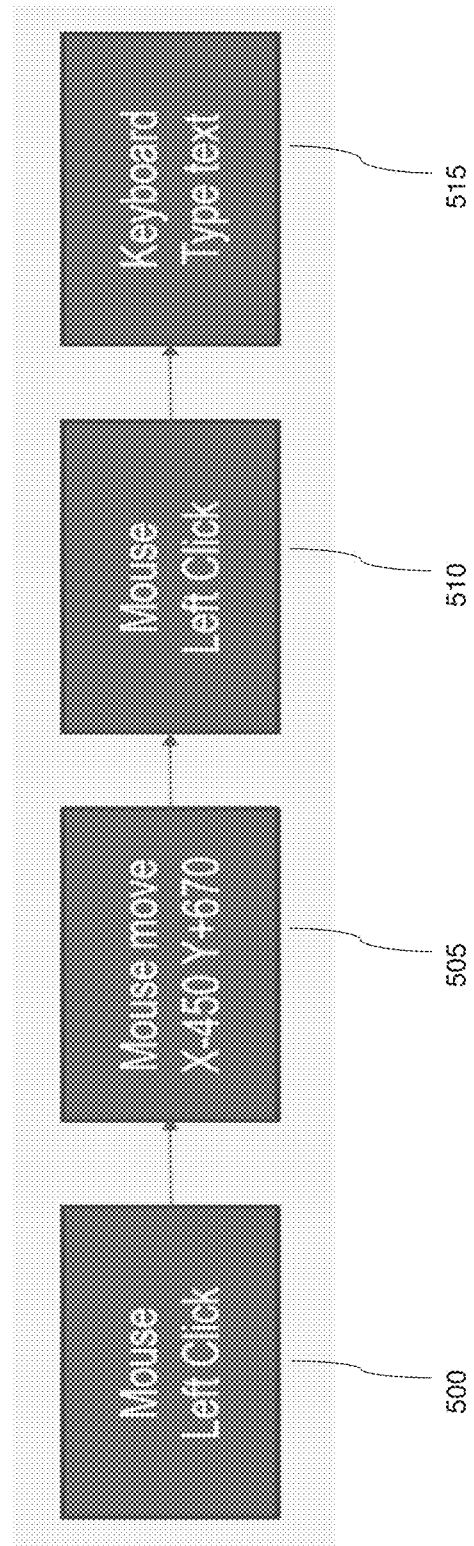
FIG. 5 illustrates a pattern type local recording trigger, where screen recording is triggered based on a combination of activities according to embodiments of the present disclosure.

FIG. 5 shows how a screen recording can be triggered based on a combination of mouse and keyboard activities. For example, screen recording can be triggered by a mouse left click 500, then a mouse moving vertically and horizontally 505, then a mouse left click 510, and then typing text on the keyboard 515.

Figure 6:
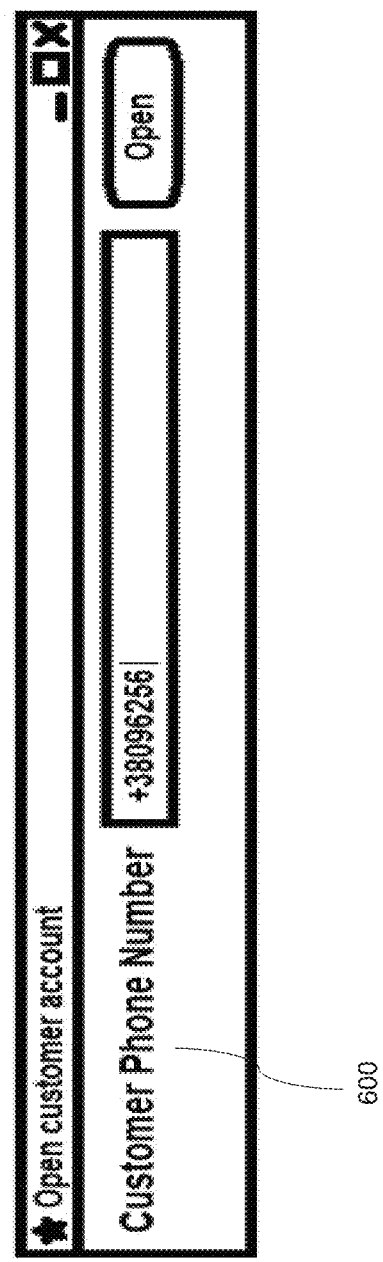
FIG. 6 illustrates a control type local recording trigger, where screen recording is triggered based on user interface controls on the screen according to embodiments of the present disclosure.

FIG. 6 illustrates how decision engine 107 monitors an agent application on agent device 105. For example, screen agent application 106 starts recording when a button with "btnOpen" control ID appears on an "OpenCustomerDlg" dialog. As shown in FIG. 6, screen agent application 106 starts recording when a window to open a customer account with a customer field (i.e., customer phone number 600) appears on the screen. Screen agent application 106 stops recording when the customer account window is closed.

Figure 7:
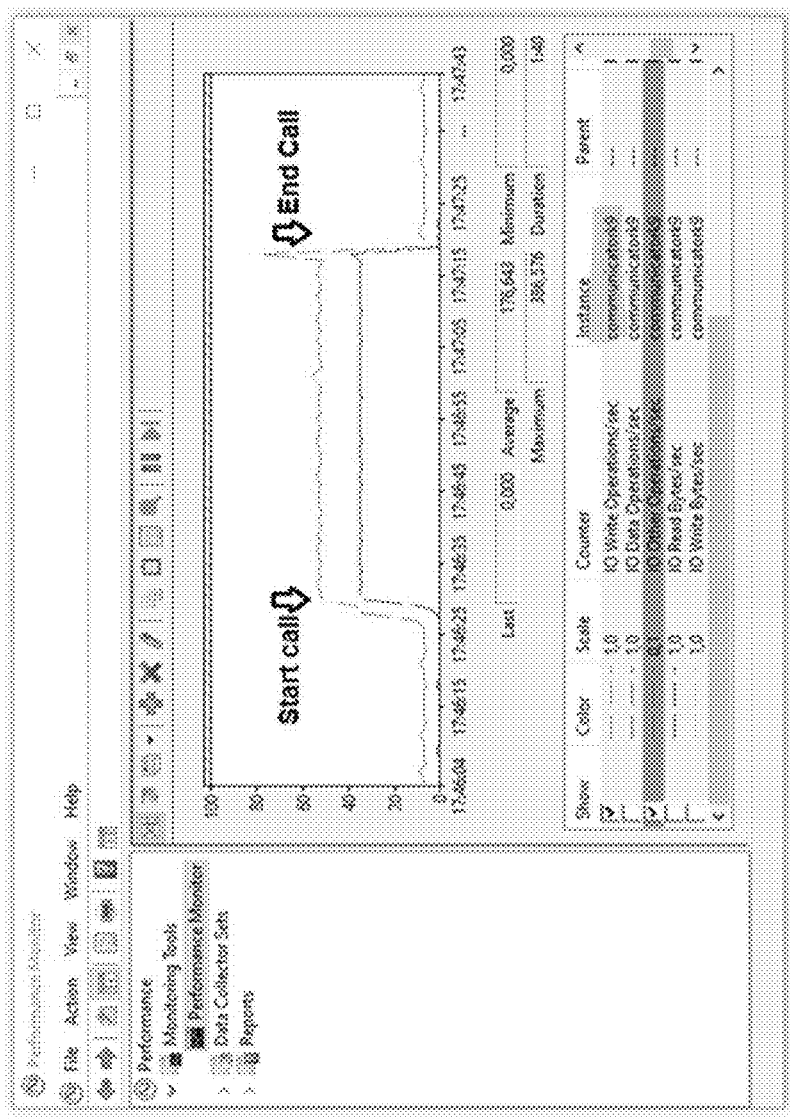
FIG. 7 illustrates a performance type local recording trigger, where screen recording is triggered based on the value of the application performance counter according to embodiments of the present disclosure.

An experiment was conducted to determine if it was possible to catch the start and stop times of a Cisco® IP Communicator softphone call. As shown in FIG. 7, the performance counters "IO Other Operations/sec" or "IO Write Operations/sec" have a different value when the softphone call is idle and when there is an active call.

First, a performance monitor (e.g., Microsoft Corporation) utility was run and performance counters of the Cisco® IP Communicator softphone process were added. In this experiment, the process name was "communicatork9.exe."

A call was made to the Cisco® IP Communicator softphone, and the call was picked up. The "IO Other Operations/sec" counter value increased from 0 to 380,000, and this was an indication that a call started so start screen recording could be triggered. When the call ended (i.e., the call was hung up), the "IO Other Operations/sec" counter value decreased from 380,000 to 0, indicating that the call had ended so stop screen recording could be triggered.

Thus, the "IO Other Operations/sec" counter can be used for triggering screen recording. In various embodiments, the local recording triggers can be configured with the following ranges: start recording range from 350,000 to 400,000, and stop recording range from 0 to 10,000. The stop recording trigger is generally active only when the start recording event is triggered. Many softphones or customer certain software have application performance counters that are possible to be used for triggering screen recording.

Figure 8:
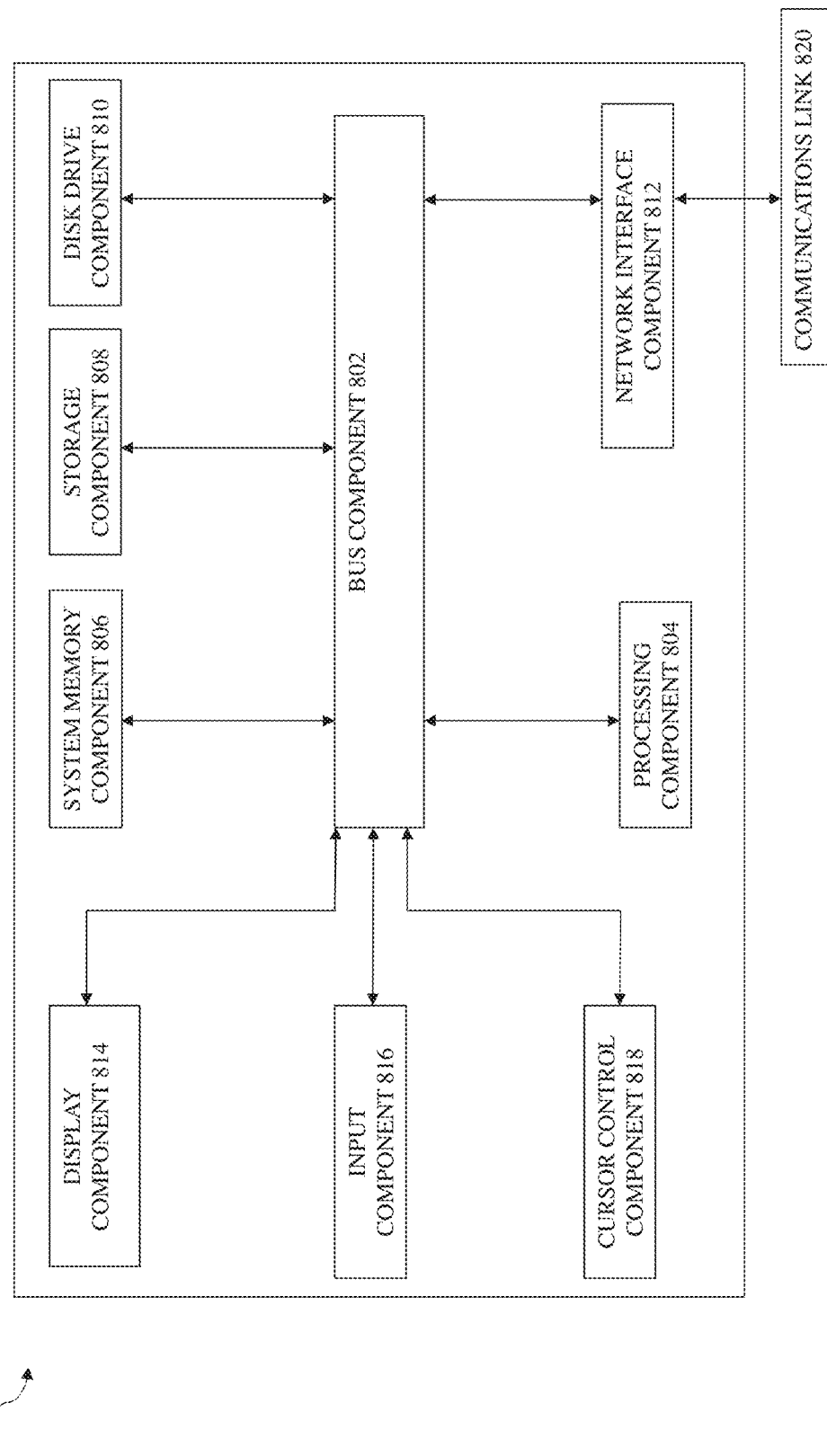
FIG. 8 is a block diagram of a computer system suitable for implementing one or more components in FIG. 1 according to one embodiment of the present disclosure.

Referring now to FIG. 8, illustrated is a block diagram of a system 800 suitable for implementing embodiments of the present disclosure. System 800, such as part a computer and/or a network server, includes a bus 802 or other communication mechanism for communicating information, which interconnects subsystems and components, including one or more of a processing component 804 (e.g., processor, micro-controller, digital signal processor (DSP), etc.), a system memory component 806 (e.g., RAM), a static storage component 808 (e.g., ROM), a network interface component 812, a display component 814 (or alternatively, an interface to an external display), an input component 816 (e.g., keypad or keyboard), and a cursor control component 818 (e.g., a mouse pad).

In accordance with embodiments of the present disclosure, system 800 performs specific operations by processor 804 executing one or more sequences of one or more instructions contained in system memory component 806. Such instructions may be read into system memory component 806 from another computer readable medium, such as static storage component 808. These may include instructions to receive, from an applications server, a recording configuration including a local recording trigger, wherein the local recording trigger includes a start screen recording event and a stop screen recording event; monitoring activity on a device of a contact center agent; initiating recording of a screen of the device when the start screen recording event is detected; transmitting data captured in the recording to a recorder; stopping the recording of the screen of the device when the stop screen recording event is detected; and stopping transmission of the data captured in the recording to the recorder. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 804 for execution. Such a medium may take many forms, including but not limited to, non-volatile media, volatile media, and transmission media. In various implementations, volatile media includes dynamic memory, such as system memory component 806, and transmission media includes coaxial cables, copper wire, and fiber optics, including wires that comprise bus 802. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 800. In various other embodiments, a plurality of systems 800 coupled by communication link 820 (e.g., LAN, WLAN, PTSN, or various other wired or wireless networks) may perform instruction sequences to practice the disclosure in coordination with one another. Computer system 800 may transmit and receive messages, data, information and instructions, including one or more programs (i.e., application code) through communication link 820 and communication interface 812. Received program code may be executed by processor 804 as received and/or stored in disk drive component 810 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A screen recording system comprising:
a processor and a computer readable medium operably coupled thereto, the computer readable medium comprising a plurality of instructions stored in association therewith that are accessible to, and executable by, the processor, to perform operations which comprise:
receiving, from an applications server, a recording configuration including a local recording trigger, wherein the local recording trigger includes a start screen recording event and a stop screen recording event;
monitoring activity on a device of a contact center agent;
initiating recording of a screen of the device when the start screen recording event is detected, wherein the start screen recording event is based on an application performance counter that monitors, counts, or measures events in software;
transmitting data captured in the recording to a recorder;
stopping the recording of the screen of the device when the stop screen recording event is detected, wherein the stop screen recording event is based on an application performance counter that monitors, counts, or measures events in software; and
stopping transmission of the data captured in the recording to the recorder.

2. The screen recording system of claim 1, wherein the application performance counter comprises a network performance counter, a central processing unit performance counter, or both.

3. The screen recording system of claim 1, wherein the application performance counter is associated with a defined threshold that is linked to the start screen recording event and the stop screen recording event.

4. The screen recording system of claim 3, wherein when a value of the application performance counter goes above the defined threshold, recording of the screen is initiated, and when the value of the application performance counter goes below the defined threshold, recording of the screen is stopped.

5. The screen recording system of claim 3, wherein the recording configuration comprises a name of the application performance counter and the defined threshold.

6. The screen recording system of claim 1, wherein:
the start screen recording event and the stop screen recording event is further based on a pattern of activity of a mouse or a keyboard, and
monitoring activity on the device of the contact center agent comprises monitoring a mouse position, a mouse click, a key pressed on the keyboard, a touch on the screen, or any combination thereof.

7. The screen recording system of claim 6, wherein the recording configuration comprises a value for movement of the mouse along a vertical axis, a value for movement of the mouse along a horizontal axis, a right click of the mouse, a left click of the mouse, the key pressed on the keyboard, or any combination thereof.

8. The screen recording system of claim 1, wherein:
the start screen recording event and the stop screen recording event is further based on user controls on the screen, and
monitoring activity on the device of the contact center agent comprises monitoring user interface controls that the contact center agent interacts with.

9. The screen recording system of claim 8, wherein the recording configuration comprises a user interface control name and a type of control event.

10. A method of recording a screen of a device of a contact center agent, which comprises:
receiving, from an applications server, a recording configuration including a local recording trigger, wherein the local recording trigger includes a start screen recording event and a stop screen recording event;
monitoring activity on the device of the contact center agent;
initiating recording of a screen of the device when the start screen recording event is detected, wherein the start screen recording event is based on an application performance counter that monitors, counts, or measures events in software;
transmitting data captured in the recording to a recorder;
stopping the recording of the screen of the device when the stop screen recording event is detected, wherein the stop screen recording event is based on an application performance counter that monitors, counts, or measures events in software; and
stopping transmission of the data captured in the recording to the recorder.

11. The method of claim 10, wherein the application performance counter comprises a network performance counter, a central processing unit performance counter, or both.

12. The method of claim 10, wherein-the application performance counter is associated with a defined threshold that is linked to the start screen recording event and the stop screen recording event.

13. The method of claim 12, wherein when a value of the application performance counter goes above the defined threshold, recording of the screen is initiated, and when the value of the application performance counter goes below the defined threshold, recording of the screen is stopped.

14. The method of claim 10, wherein:
the start screen recording event and the stop screen recording event is further based on a pattern of activity of a mouse or a keyboard, and
monitoring activity on the device of the contact center agent comprises monitoring a mouse position, a mouse click, a key pressed on the keyboard, a touch on the screen, or any combination thereof.

15. The method of claim 10, wherein:
 the start screen recording event and the stop screen recording event is further based on user controls on the screen, and
 monitoring activity on the device of the contact center agent comprises monitoring user interface controls that the contact center agent interacts with.

16. A non-transitory computer-readable medium having stored thereon computer-readable instructions executable by a processor to perform operations which comprise:
 receiving, from an applications server, a recording configuration including a local recording trigger, wherein the local recording trigger includes a start screen recording event and a stop screen recording event;
 monitoring activity on a device of a contact center agent;
 initiating recording of a screen of the device when the start screen recording event is detected, wherein the start screen recording event is based on an application performance counter that monitors, counts, or measures events in software;
 transmitting data captured in the recording to a recorder;
 stopping the recording of the screen of the device when the stop screen recording event is detected, wherein the stop screen recording event is based on an application performance counter that monitors, counts, or measures events in software; and
 stopping transmission of the data captured in the recording to the recorder.

17. The non-transitory computer-readable medium of claim 16, wherein the application performance counter comprises a network performance counter, a central processing unit performance counter, or both.

18. The non-transitory computer-readable medium of claim 17, wherein:
 the start screen recording event and the stop screen recording event is further based on user controls on the screen, and
 monitoring activity on the device of the contact center agent comprises monitoring user interface controls that the contact center agent interacts with.

19. The non-transitory computer-readable medium of claim 16, wherein the application performance counter is associated with a defined threshold that is linked to the start screen recording event and the stop screen recording event.

20. The non-transitory computer-readable medium of claim 16, wherein:
 the start screen recording event and the stop screen recording event is further based on a pattern of activity of a mouse or a keyboard, and
 monitoring activity on the device of the contact center agent comprises monitoring a mouse position, a mouse click, a key pressed on the keyboard, a touch on the screen, or any combination thereof.

\* \* \* \* \*